L. RISK.
TIRE CHARGING AIR PUMP.
APPLICATION FILED DEC. 7, 1917.

1,278,387.

Patented Sept. 10, 1918.
2 SHEETS—SHEET 1.

WITNESSES
H. L. Opsahl.
A. H. Opsahl.

INVENTOR
LOREN RISK.
BY HIS ATTORNEYS

L. RISK.
TIRE CHARGING AIR PUMP.
APPLICATION FILED DEC. 7, 1917.
1,278,387.
Patented Sept. 10, 1918.
2 SHEETS—SHEET 2.
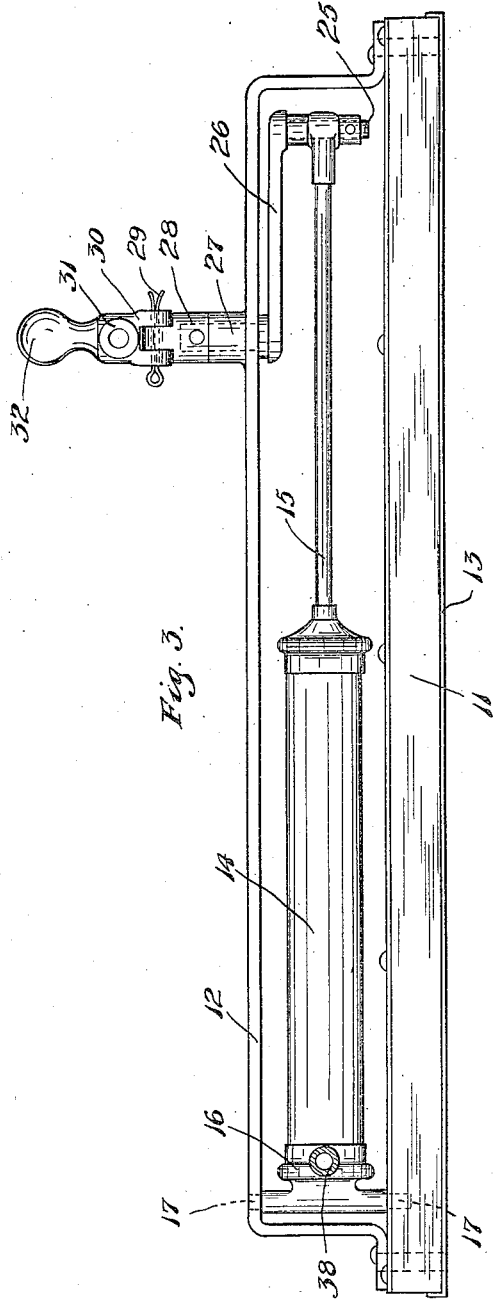
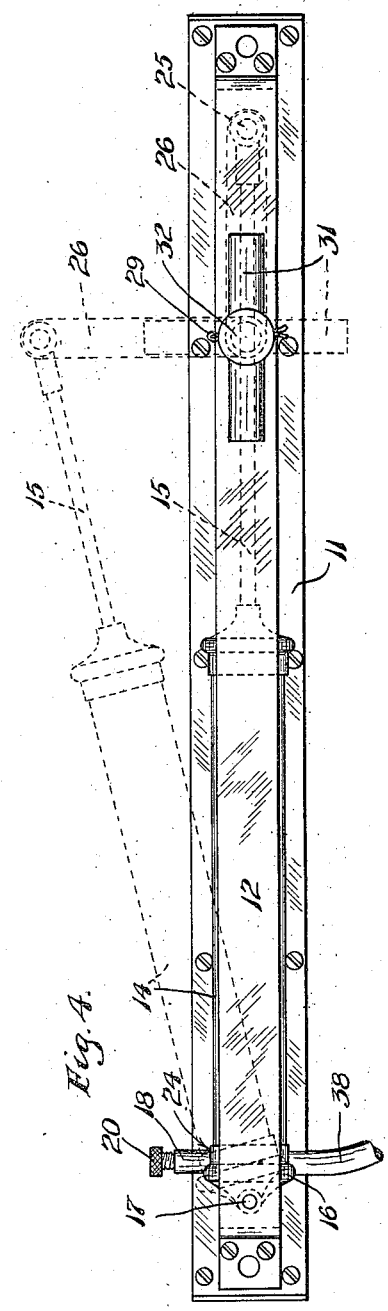
WITNESSES.
H. L. Opsahl.
A. H. Opsahl.
INVENTOR.
LOREN RISK.
BY HIS ATTORNEYS.

UNITED STATES PATENT OFFICE.

LOREN RISK, OF MINNEAPOLIS, MINNESOTA.

TIRE-CHARGING AIR-PUMP.

1,278,387.  Specification of Letters Patent.  Patented Sept. 10, 1918.

Application filed December 7, 1917. Serial No. 206,053.

*To all whom it may concern:*

Be it known that I, LOREN RISK, a citizen of the United States residing at Minneapolis, in the county of Hennepin and State of Minnesota, have invented certain new and useful Improvements in Tire-Charging Air-Pumps; and I do hereby declare the following to be a full, clear, and exact description of the invention, such as will enable others skilled in the art to which it appertains to make and use the same.

My invention has for its object to provide a simple, efficient and low cost power operated tire charging air pump especially adapted for use in inflating the pneumatic tires of automobiles or motor propelled vehicles; and to such ends, generally stated, the invention consists of the novel devices and combinations of devices hereinafter described and defined in the claims.

More definitely stated, this invention relates to that type of air pump that is applicable to the vehicle wheel and is adapted to operate by rotation of the wheel to which it is applied to charge the tire of that wheel. The nature of the invention will be made clear by the following detailed description.

In the accompanying drawings which illustrate the invention, like characters indicate like parts throughout the several views.

Referring to the drawings,

Fig. 3 is a side elevation of the pump attachment removed from working position;

Fig. 4 is a front or face elevation of the parts shown in Fig. 3;

Figure 1:
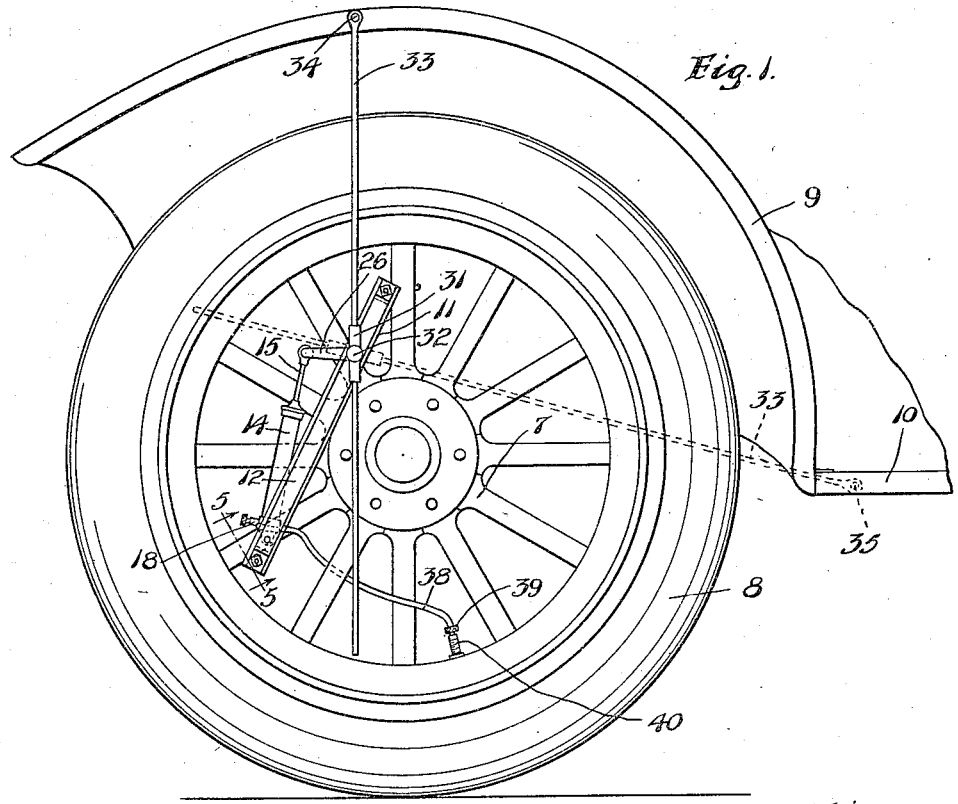
Figure 1 is a side elevation showing one of the front wheels, one of the front mud guards and a portion of the running board of an automobile, and further showing the preferred form of my improved pump applied thereto.
Figure 5:
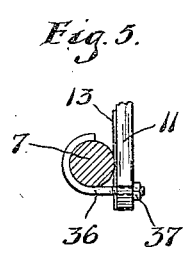
Fig. 5 is a detail in section on the line 5—5 of Fig. 1.
Figure 2:
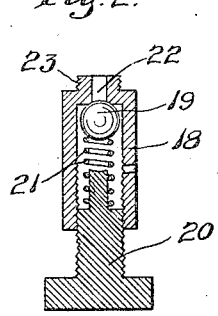
Fig. 2 is an axial section showing in detail the relief valve of the air pump.

Of the parts of the automobile, in so far as they are shown, the numeral 7 indicates one of the front wheels, the numeral 8 its pneumatic tire, the numeral 9 the front mud guard and the numeral 10 the running board.

The pumping attachment comprises a framework preferably made up of a base bar 11 and a metallic yoke 12, which latter has offset ends riveted, bolted, or otherwise rigidly secured to the ends of the said base bar 11. The base bar 11 is designed to be directly secured to the spokes of the wheel, and to prevent marring of the spokes, is shown as provided with a pliable facing strip 13 of leather, felt, or the like.

The pump proper comprises a cylinder 14 and a piston having a stem 15 projected from and working through the head thereof in the customary way. This air pump proper may be of any suitable type, such, for example, as any one of the well known hand operated tire charging pumps found on the market; but at its base end, it is provided with a head 16 having diametrically projecting gudgeons 17 that are journaled, one in the base bar and the other in the yoke 12, so that the said pump is adapted to oscillate between said bar and yoke. To prevent excessive pressure from being produced in the pump, it is provided with a relief or blow-off valve, which, as shown, comprises a valve casing 18, a check valve 19, a pressure adjusting plug 20 and a spring 21. The plug 20 has screw-threaded engagement with the interior of the casing 18 and the spring 21 is compressed between said plug and the check valve or bolt 19, thereby holding the latter in position to close the venting port 22 in the inner end of said casing. At its inner end, the said casing 18 has a threaded shank 23, which, as shown, is screwed into an air passage 24 that leads from the pressure end of the pump cylinder through one side of the cap 16. By adjustments of the plug 20, the relief valve may be set to open under any desired pressure, and, if desired, the said plug may be graduated to indicate the pressure at which it will permit the pump to blow off air, and hence, cease charging the tire to higher pressure.

The extended end of the piston rod 15 is journaled to a wrist pin 25 carried by the arm of a crank 26, the shaft of which is journaled in a bearing 27 on the yoke 12 and has a knuckle joint head 28 rigidly secured to its projecting end. Pivotally connected, as shown, by a pintle-acting split key 29, to the projecting lug of the head 28 is a coöperating knuckle head 30 which has a transversely extended sleeve 31. The head 30 is shown as provided with a projecting knob 32 for a purpose which will presently appear.

Working loosely and telescopically through the sleeve 31 is an anchor rod 33 which, at its outer end, may be anchored to the mud guard 9 at 34, as shown in Fig. 1 by full lines, or which may be anchored to the running board 10 at 35, as indicated by dotted lines in said Fig. 1.

The pump frame is adapted to be applied to the wheel transversely of certain of the spokes thereof and at a point between the hub and rim of the wheel; and to anchor its ends to the adjacent spokes, I preferably provide hook bolts 36 equipped with nuts 37. The hook ends of these bolts directly engage the spokes, or they may be provided with a covering, not shown, to prevent marring of the spokes. The threaded ends of the said bolts 36 are passed through perforations in the ends of the frame bar 11, and the nuts 37 are tightly screwed against said bar.

When the pumping attachment is thus applied to the wheel, the axis of the crank shaft 27 will be eccentric to the axis of the wheel to which it is applied, and hence, under rotation of the wheel, the sleeve 31 will be caused to slide on the anchor rod 33, and the latter will be caused to oscillate. Inasmuch, however, as the sliding engagement between the sleeve 31 and the anchor rod 33 holds the crank arm 26 against rotation on its own axis, and inasmuch as the pump frame and pump proper are caused to rotate around the axis of the wheel, it, of course, follows that a reciprocating motion will be imparted to the pump piston. The attachment is preferably applied so that the inward or air compressing stroke of the piston will be produced while the attachment is moving from its upper toward its lower position, or in other words, while it is moving downward on that side in which it is shown in Fig. 1.

The pump cylinder 14, at its compression end, and preferably at that side that is opposite to the check valve above noted, is provided with a small air hose or flexible air delivery pipe 38 that is equipped at its free end with the usual threaded coupling 39 for connecting it to the charging nipple 40 of the pneumatic tire 8. Hence, it follows that when the air pump is operated, as above described, air will be delivered into the tire and the tire will be charged up to the point where the safety or blowoff valve of the pump is caused to open up.

Both back and front wheels of the automobile are usually set slightly out of true vertical planes and this, as is evident, will cause the pumping attachment to rotate on a plane that is not coincident with a vertical plane, and moreover, it will usually happen that it will not be convenient to set the rod in a true vertical plane longitudinally of the machine, even where it is possible to set the same in a true vertical plane transversely of the machine.

Figure 6:
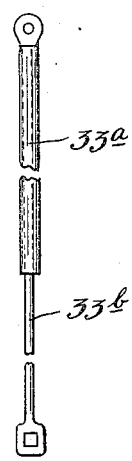
Fig. 6 is a side elevation showing a modified form of the crank operating rod of the attachment.

The knuckle joint 28—30 compensates for the variations in the movement of the pumping attachment from a true vertical plane longitudinally of the machine. Rotation of the sleeve 31 on the anchor rod 33 permits the oscillatory steering movements of the front wheels when the attachment is applied to the front wheels. In fact, the knuckle joint and the sliding rotary connection between the crank and anchor rod compensate for all irregularities of the movements in the pumping attachment from a true vertical plane longitudinally of the machine and make it unnecessary to apply the attachment to the wheel with any particular accuracy. When the attachment is applied to a front wheel, the anchor rod will usually be anchored to the overlying portion of the mud guard, but when it is attached to a rear wheel, the said rod will usually be anchored to the running board. However, the anchor rod may be secured to or anchored in any one of a good many different ways. Moreover, the anchor rod, itself, may take various forms. For example, it might be made up of telescopic sections $33^a$ and $33^b$, as shown in Fig. 6, in which case, the upper end of the sleeve member $33^a$ would be anchored to the mud guard, for example, and the lower end of the rod member $33^b$ would be suitably secured to the head or member 28, so as to hold the crank 26 against rotation.

When a tire is flat or has a very low air pressure, it will be desirable to jack up the wheel and rotate the same with the attachment, so as to get a fairly high initial charge in the tire before the higher compression is produced by running of the machine. This rotation of the wheel may be produced very readily by taking hold of the knob 32 of the knuckle head 30, and using the same as a crank having an offset from the axis of the wheel, to cause the said wheel to rotate, thereby producing the initial charge above indicated.

The term "telescopically extensible" as applied to the anchor rod is used in a liberal sense to include any kind of an anchor connection that is longitudinally extensible and contractible, in such manner as to permit the pump operating crank to revolve around the axis of the wheel. In the preferred form of the device illustrated in Figs. 1 to 4, inclusive, the anchored telescopic connection is made up of the rod 33 and the sleeve 31.

The above described crank attachment may be manufactured at comparatively small cost; it may be very quickly applied to and removed from the wheel; and when applied and used it, as has been demonstrated in practice, is highly efficient for the purposes had in view.

What I claim is:

1. A pumping attachment for wheels having pneumatic tires comprising a cylinder and piston air pump, a crank connected to one of the said pump members, means for pivotally anchoring the other pump member and said crank to a wheel with the axis of said crank eccentric to the axis of said wheel, and a telescopic anchoring connection adapted to be anchored to a non-rotary part of a vehicle and to hold said crank against rotation on its own axis while it is revolved around the axis of said wheel to produce the pump reciprocation.

2. A pumping attachment for wheels having pneumatic tires comprising a cylinder and piston air pump, a crank connected to one of the said pump members, means for pivotally anchoring the other pump member and said crank to a wheel with the axis of said crank eccentric to the axis of said wheel, a telescopic anchoring connection adapted to be anchored to a non-rotary part of a vehicle and to hold said crank against rotation on its own axis while it is revolved around the axis of said wheel to produce the pump reciprocation, and an air delivery pipe extending from the compression end of the pump cylinder and applicable to the charging nipple of the tire.

3. A pumping attachment for wheels having pneumatic tires comprising a pump supporting frame having means for attaching it to the spokes of a wheel having a pneumatic tire, a pump cylinder pivotally connected to said frame, a piston working in said cylinder and having a projecting rod, a crank pivotally connected to said frame, with its axis eccentric to the axis of the wheel, an air delivery tube extended from the compression end of said pump cylinder and having means for attaching it to the charging nipple of a pneumatic tire of said wheel, an anchoring rod adapted to be anchored to a non-rotary part of the machine, and a sleeve telescopically movable on said rod and connected to said crank to hold the same against rotation on its own axis while it is revolved around the axis of the wheel.

4. A pumping attachment for wheels having pneumatic tires comprising a pump supporting frame having means for attaching it to the spokes of a wheel having a pneumatic tire, a pump cylinder pivotally connected to said frame, a piston working in said cylinder and having a projecting rod, a crank pivotally connected to said frame, with its axis eccentric to the axis of the wheel, and a telescopically extensible anchoring connection having means for anchoring it to a non-rotary part of the vehicle and connected to said crank by a knuckle joint which holds said crank against rotation on its own axis while it is being revolved around the axis of the wheel but permits lateral angular movements of the said pumping attachment while it is being rotated.

5. The combination with a vehicle having wheels equipped with pneumatic tires, of a pumping attachment comprising a pump supporting frame having means for securing it to one of the wheels of said vehicle, a cylinder and piston air pump, the cylinder thereof being pivotally connected to said frame, a crank connected to the rod of the pump piston with its axis eccentric to the axis of the wheel to which it is applied, a charging pipe extending from the compression end of said cylinder to the charging nipple of the tire, a sleeve having a knuckle joint connection to said crank, and an anchoring rod anchored to a non-rotary part of the vehicle and working telescopically through said sleeve.

In testimony whereof I affix my signature in presence of two witnesses.

LOREN RISK.

Witnesses:
Eva E. König,
F. D. Merchant.

Copies of this patent may be obtained for five cents each, by addressing the "Commissioner of Patents, Washington, D. C."